United States Patent [19]

Portier

[11] 4,048,851
[45] Sept. 20, 1977

[54] AXIAL AND ANNULAR MAGNETO-ELASTIC DYNAMOMETERS

[75] Inventor: Jean Louis Portier, Paris, France

[73] Assignee: Soletanche, France

[21] Appl. No.: 568,173

[22] Filed: Apr. 15, 1975

Related U.S. Application Data

[63] Continuation of Ser. No. 420,276, Nov. 29, 1973, abandoned.

[30] Foreign Application Priority Data

Oct. 9, 1973 France .................... 73.35986

[51] Int. Cl.² ............................................ G01R 33/12
[52] U.S. Cl. .............................. 73/141 A; 73/DIG. 2; 324/34 ST; 336/20
[58] Field of Search ......................... 324/34 ST, 34 R; 73/DIG. 2, 141 A; 336/20

[56] References Cited

U.S. PATENT DOCUMENTS

| 2,053,560 | 9/1936 | Janovsky | 324/34 ST |
|---|---|---|---|
| 3,258,962 | 7/1966 | Dahle | 324/34 ST |
| 3,577,108 | 5/1971 | Bengtson | 73/141 |
| 3,745,448 | 7/1973 | Hiratsuka et al. | 324/34 ST |

FOREIGN PATENT DOCUMENTS

| 658,569 | 10/1934 | Germany | 73/DIG. 2 |
|---|---|---|---|
| 745,977 | 12/1943 | Germany | 324/34 ST |
| 150,672 | 6/1961 | U.S.S.R. | 73/DIG. 2 |
| 176,447 | 8/1964 | U.S.S.R. | 324/34 R |
| 231,175 | 3/1967 | U.S.S.R. | 324/34 ST |
| 231,177 | 5/1966 | U.S.S.R. | 324/34 ST |

Primary Examiner—Robert J. Corcoran
Attorney, Agent, or Firm—Stevens, Davis, Miller & Mosher

[57] ABSTRACT

An apparatus and method for measuring stresses or forces by measurement of variations of the magnetic properties of ferromagnetic substances under stress conditions. This is carried out by providing a ring of ferromagnetic material between two parallel faces on or between which the stresses are exerted, the ring defining a magnetic circuit, providing an electric coil within and around the ring, passing a current through the coil and measuring changes in the properties of the current to measure variations in the magnetic properties of the ring.

12 Claims, 30 Drawing Figures

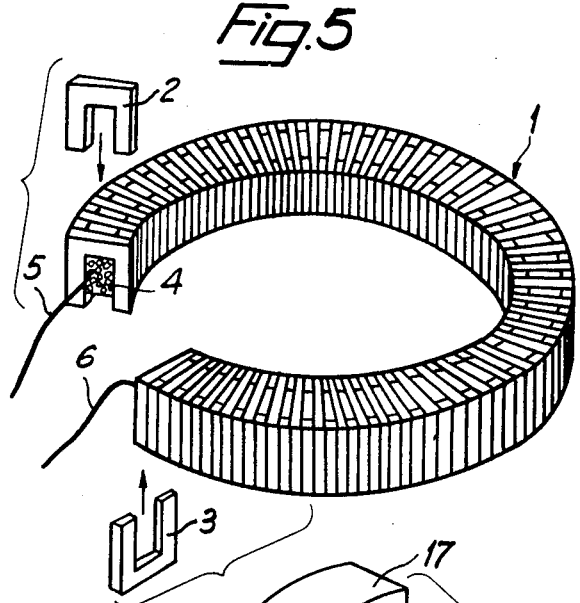
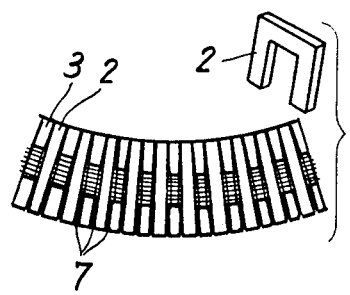
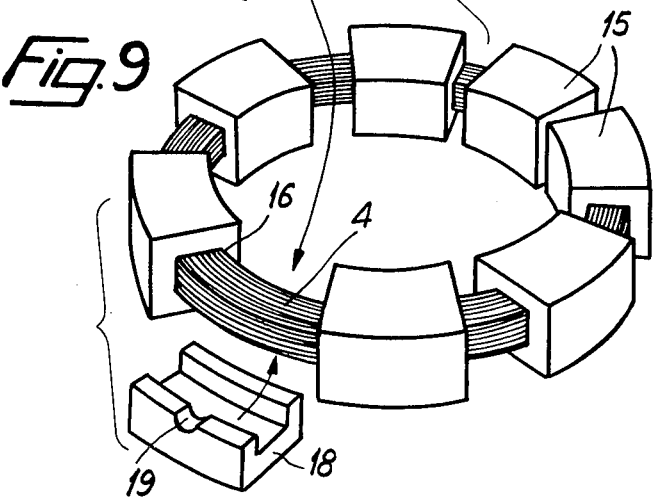
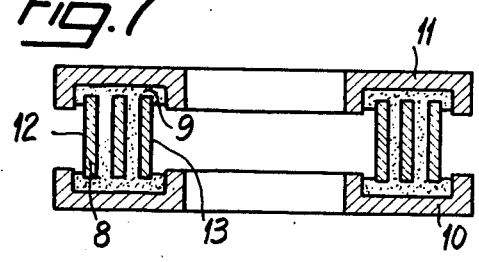
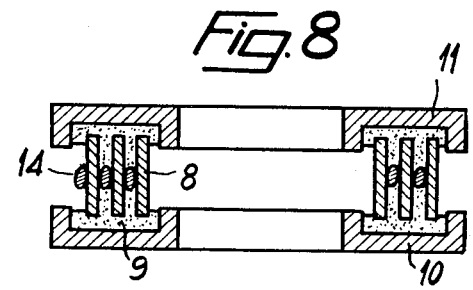

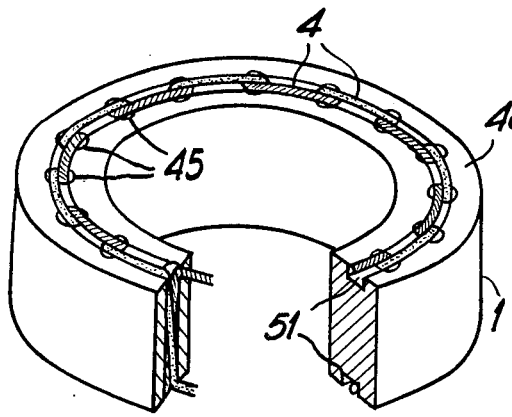
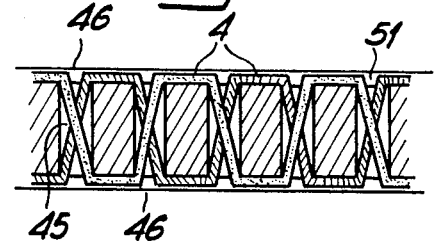
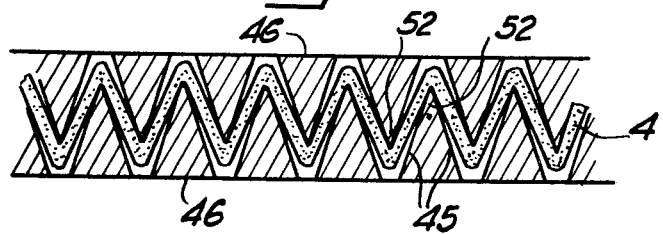
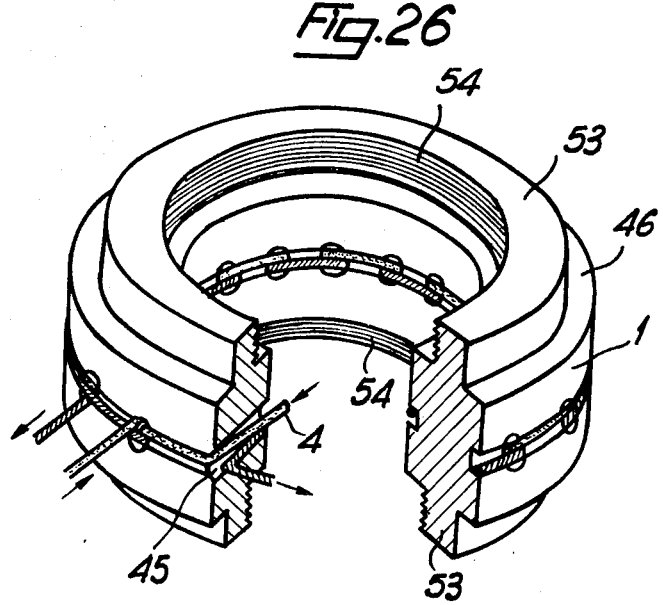

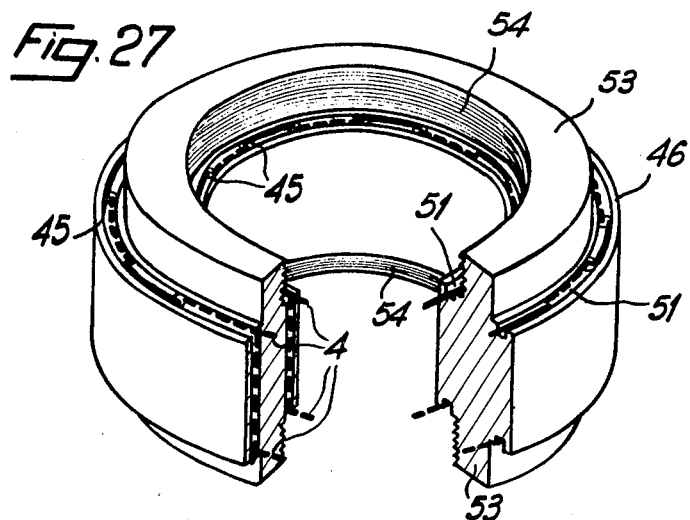
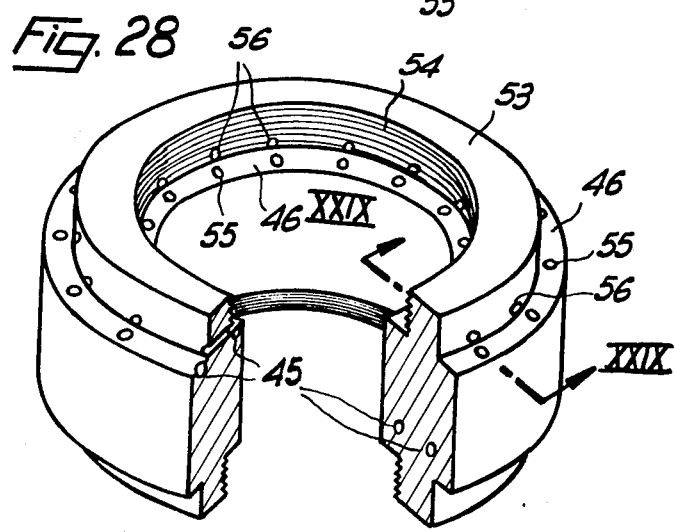
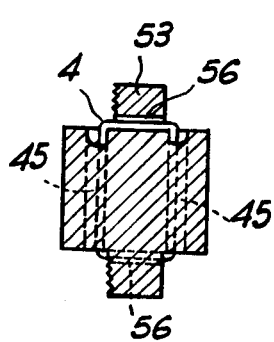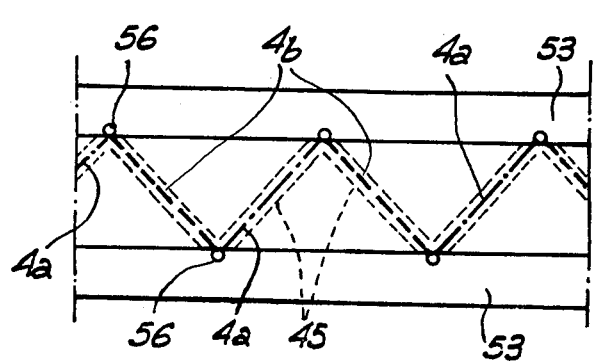

AXIAL AND ANNULAR MAGNETO-ELASTIC DYNAMOMETERS

This is a continuation of application Ser. No. 420,276 filed Nov. 29, 1973, now abandoned.

The invention relates to devices for measuring stresses or forces, which operate by measuring variations of the magnetic properties of ferromagnetic substances under stress conditions. This phenomenon is known as magneto-elasticity and is the converse of the better known property of magnetostriction.

One of the earlier users of the phenomenon was Marcel REIMBERT who published, in 1946, in the proceedings of the French Institut Technique du Batiment et des Travaux Publics, an application of these properties to the determination of stresses in concrete reinforcing bars.

However, in spite of a number of early experiments in industrial plants, the use of magneto-elasticity as a control or checking means has been progressively abandoned, probably because the equipment used in these attempts exhibited hysteresis problems. If it were possible to overcome this problem, the use of the magneto-elastic phenomenon would possess many advantages in the measurement of stresses.

The majority of stress gauges at present in use are strain gauges which measure variations in elongation between two points of a structure and, on the assumption that the stress-strain relationship is known, the forces may be determined. Using this type of apparatus, even the measurement of the strain itself is, in fact, an indirect operation, because the technique amounts to measuring the deformations of an intermediate part ("strain gauge" or vibrating wire) which it is often difficult to attach correctly on the structure in which the stresses are to be measured. Moreover, when it is desired to integrate the stresses to arrive at the forces, it is necessary to multiply the measuring points and thus to increase the risk of error.

The essential object of the present invention is to overcome these disadvantages in order to enable magneto-elasticity to be usefully employed. This property, by contrast, gives overall variations in the mass under investigation and not a variation in an intermediate layer.

According to the invention a method of measuring such stresses and forces comprises the steps of providing a ring of ferromagnetic material between two substantially parallel surfaces on or between which the stresses are to be measured, said ring defining a magnetic circuit, providing an electric coil disposed within and around said ring, passing a current through said coil, measuring changes in the characteristics of said current to measure variations in the magnetic properties of said ring and hence providing an indication of the forces or stresses to be measured.

The measurement consists of determining the variations in the resistive and magnetic properties of the material, which can be carried out in a number of possible ways.

In particular, it will be possible to utilize an alternating current having a frequency which may vary over a very wide range and to determine the total impedance, the real impedance or the imaginary impedance.

The invention also includes a device for measuring the stresses or forces exerted on or between two substantially parallel faces, said device comprising a ring of ferromagnetic material defining a magnetic circuit, said ring including two axially opposed faces adapted to be located against said parallel faces, means defining a channel in said ring, an electrical coil disposed within said channel, adapted to be supplied with an electric current, and means for measuring changes in the characteristics of said current.

The magnetic circuit may be constituted either of juxtaposed thin sheets, or of juxtaposed elementary blocks, or again of two blocks or of one single block.

The apparatus possesses the following advantages, in comparison with the dynamometric wedges at present in use:

Small bulk, whatever the magnitude of the forces to be measured,

Overall measurements within the body and not point measurements at the surface, thus enabling a direct integration of the stresses to be achieved without increasing the number of points of measurement, A greater facility of measuring than with an apparatus of the "strain gauge" type, since the impedance variations are from 10 to 100 times greater, High resistance to ageing, to humidity and to temperature, Good linearity and quasi-zero hysteresis, resulting in very high accuracy and affording the possibility of directly calibrating the reading instruments in terms of forces.

The ferromagnetic material could be any normal steel, magnetic steel, or ferrites etc. capable of withstanding the applied forces or stresses.

This therefore makes it possible to integrate directly the inevitable variations from one point to another of the structure. Moreover, in comparison with the variations of resistance to temperature changes in a conventional gauge of the "strain gauge" type, the variations of magnetic permeability are from 10 to 100 times stronger in relative value, thus allowing the influence of temperature to be practically ignored.

Finally, the simplicity of the measuring device which is composed of a number of turns of electrical wire enables devices of extremely small dimensions to be produced.

In order to facilitate an understanding of the invention, it is first necessary to explain the behavior of a ferromagnetic material in the presence of a stress and this, together with several examples of devices constructed in accordance with the invention will now be described with reference to the accompanying drawings, in which:

FIG. 5 is a view of a first device according to the invention realized by means of wedge-shaped magnetic parts arranged radially and adjacent to one another;

FIG. 6 is a partial view of a modification, in which the radial pieces have parallel faces and are surrounded by an insulating material;

FIG. 7 is a diametral sectional view of an example in which the magnetic circuit is formed by a strip, which is wound as a spiral and also serves for the passage of the electric current;

FIG. 8 is a similar view of a modification, in which the current does not pass through the spiral but through a parallel conductor;

FIGS. 9 and 10 are perspective views of a device, the magnetic circuit of which is formed of hollow annular segments, FIG. 9 showing the device in course of assembly of FIG. 10 showing the completed device;

FIG. 23 is a view analogous to FIG. 20 but relating to a further modification in which the ducts are formed parallel to the axis of the ring;

FIG. 24 is a developed view showing the arrangement of the ducts and the winding in FIG. 23;

FIG. 25 is a view analogous to FIG. 24, but showing convergent-divergent ducts;

FIGS. 26 and 27 are perspective views partly cut away and relating to devices so constructed that they can be used either in compression or in tension;

FIG. 28 is a view analogous to the foregoing but relating to a device which may be used in compression, in tension and in torsion;

FIG. 29 is a section through XXIX - XXIX of FIG. 28; and,

FIG. 30 is a partially developed view corresponding to FIGS. 28 and 29 and showing the arrangement of the two windings of the device.

Figure 1:
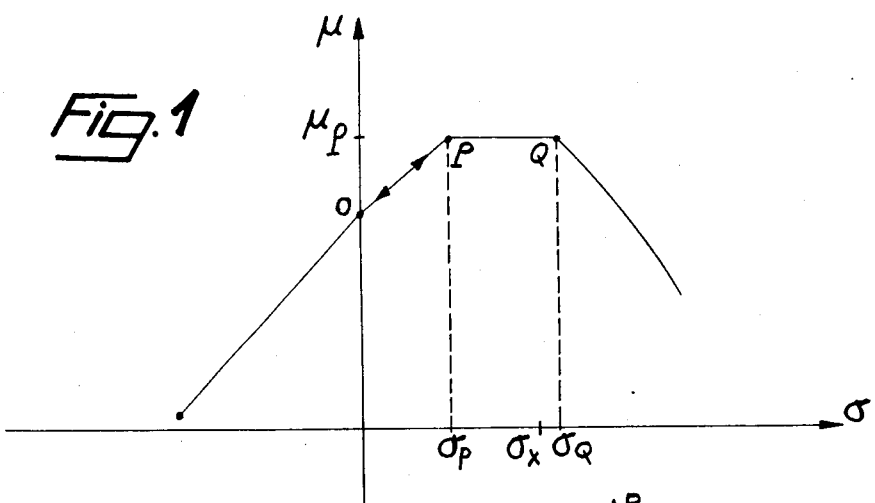
FIG. 1 is a graph showing the variations in the magnetic permeability $\mu$ of a magnetic material, as a function of the stress $\sigma$, in the direction parallel to the stress.

Firstly, considering FIGS. 1 to 4, and in particular FIG. 1, if one is discussing the domain of pure compression, then after a certain number of force cycles the equation $\mu = f(\sigma)$ becomes approximately linear and independent of the direction of variation of the stress (portion of the curve to the left of the $\mu$-axis).

As soon as tension is exerted, the phenomena change. From 0 to the point P, which corresponds to the permeability $\mu p$, the relationship is both reversible and linear. By contrast, as soon as the stress exceeds the value P, a horizontal plateau PQ occurs, followed by an abrupt fall in permeability.

Consequently, if a permeability value of $\mu p$ is measured, it is not possible to know the value of the corresponding stress.

Moreover if, for example, a traction of $\sigma_x$ is exerted, lying between the values $\sigma_p$ and $\sigma_Q$ which correspond to the points P and Q, the return path is not the same. Hysteresis is present and accounts for this non-reversibility.

One of the advantages of the invention is that the ferromagnetic device can be constructed so that it operates predominantly in compression, under the effects of compressive forces by reducing to a minimum the flexion stresses or traction stresses, so that its functioning does not extend outside the range of linearity and reversibility referred to above.

Figure 2:
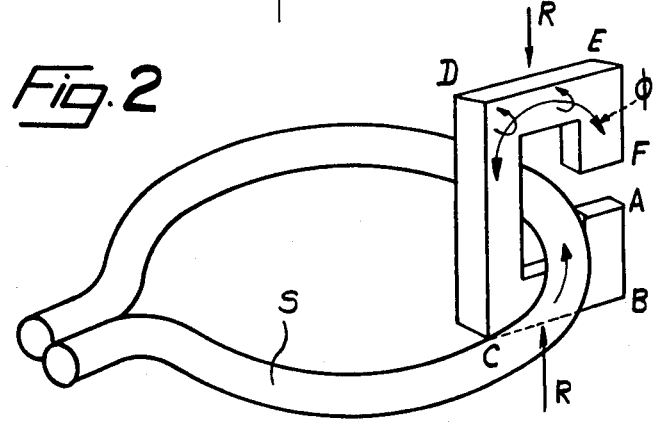
FIG. 2 shows diagrammatically, a magnetic circuit disposed around a turn of current carrying wire.

If, as shown diagrammatically in FIG. 2 of the attached drawing, a magnetic circuit ABCDEF is disposed around a turn S through which an alternating current flows, two types of phenomena become apparent:

in the first place, a flux $\phi$ surrounds the current I, flowing in the wire turn, in the second place, parasitic currents known as eddy currents are induced in the magnetic circuit by the flux $\phi$.

The laws relating to the passage of the flux $\phi$ through the magnetic circuit are comparable to those which govern the passage of a current through a resistance. In particular, the presence of a parasitic air-gap such as FA produces a large reluctance as a consequence of the great difference in magnetic permeability.

It follows that the apparent variation in the permeability of the circuit under the effect of a force R will be considerably reduced, firstly because of the difference in permeability in the air gap, and secondly because of the variations in this air gap under the effect of R. One of the advantages of the invention is that special constructional arrangements can nullify or reduce the influence of this air gap.

Figure 3:
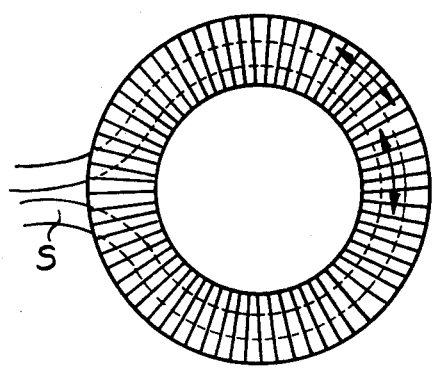
FIG. 3 shows a modification of FIG. 2, with magnetic circuits being disposed around the turn of wire, all around its path.
Figure 4:
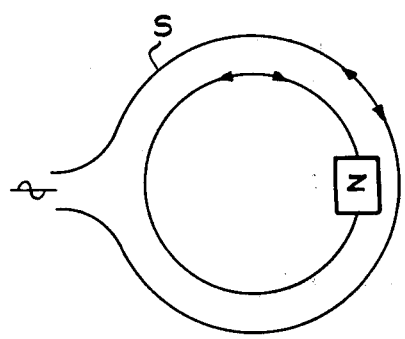
FIG. 4 shows how a transformer is effectively produced by the circuit shown in FIG. 3.

If, as shown in FIG. 3, circuits such as ABCDEF are arranged side by side all around the turn S so that they constitute a complete torus, this amounts, from the point of view of eddy currents, to the creation of a transformer (shown diagrammatically in FIG. 4), the primary of which is the turn S and the secondary the ring of ferromagnetic material, which may be likened to a secondary connected to an impedance Z.

If the magnetic circuit is constituted of insulated thin sheets arranged side by side, the pure resistance of Z can be considered infinite for calculation purposes and this therefore amounts to opening the secondary of the transformer such that the eddy currents are zero for calculation purposes.

If, by contrast, the magnetic circuit is a ring in a single piece, the real resistance of the impedance Z will be that which is offered to the passage of the current through the ring of magnetic material.

In each of these cases, the application of an external force involves the risk of modifying the intrinsic impedance Z of the circuit, either by the formation of external short circuits between thin sheets, or by modifying the resistivity in the body itself of the material.

The invention adopts constructional arrangements such that these random variations in the eddy currents are nullified.

Referring now to the FIGS. 5 to 30, examples of devices of the invention will be described. In FIG. 5 the magnetic circuit 1 of the device is formed of pieces of ferromagnetic metal 2 and 3 of small thickness (at most a few millimeters) having a U-shape with a flat base and parallel legs inserted alternately in opposite directions onto a winding 4 of insulated electrical wire, so as to form a closed ring, out of which only the ends 5 and 6 of the winding emerge. The arms of the parts 2 and 3 are parallel to the axis of the ring.

This ring is intended to be compressed axially between two surfaces by forces which it is desired to measure. This compression does not produce any variation in the air gap due to the construction of the ring and causes the device to operate only in compression. In order to prevent the pieces 2 and 3 from buckling it is possible, as indicated in FIG. 5, to construct these pieces in the form of annular segments adjacent to one another in the ring. The pieces can be short circuited by a metal connection of low resistivity (an external copper wire, conducting varnish or the like) in order to eliminate random variations in the Foucault currents. It is also possible to use pieces having parallel faces, for example cut from plate and to glue said pieces by means of a filling material 7, of synthetic plastics for instance, as indicated in FIG. 6. The insulating material may completely surround each piece to prevent it from coming into contact with its neighbors and with their faces.

As shown in FIG. 7, it is also possible to form the device by means of a strip 8 of ferromagnetic material rolled into a spiral and encased in insulating resin 9. The ring formed in this way is then seated between two annular bearing plates 10 and 11 each possessing a shallow slot intended to receive the ring. The measuring current can be passed directly through the spiral, by means of conductors 12 and 13.

In a modification shown in FIG. 8, the current passes through a wire 14 wound simultaneously with the strip 8. It would also be possible to use two spirals so arranged that, on two adjacent turns, the current flows in opposite directions.

Figure 10:
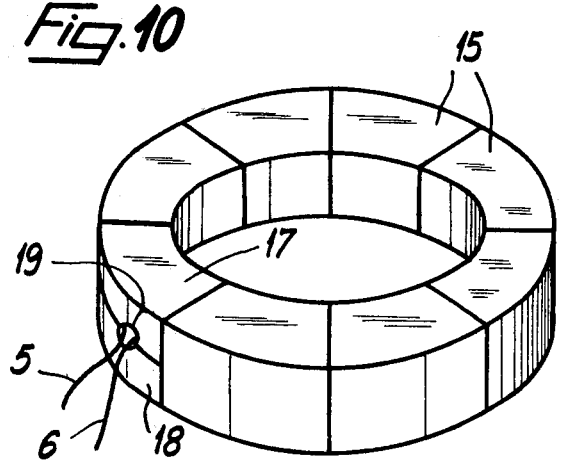

In the example shown in FIGS. 9 and 10, the ring is formed of blocks 15 in the form of larger hollow annular segments, through the holes 16 of which the wire forming the winding 4 is threaded. The ring is completed by closure blocks 17 and 18, in the form of a channel, which are arranged one upon the other in the manner of the keystones of an arch. The blocks 17 and 18 can provide a passage 19 for the ends of the winding. The various blocks can be glued together or may be left free, thus allowing them some play so that they can adapt to unevenness in the supports.

Figure 11:
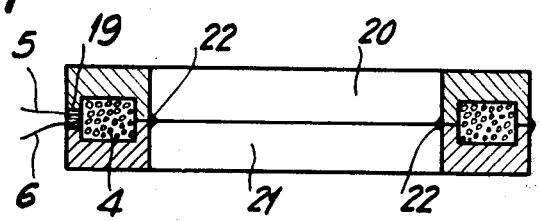
FIG. 11 is a diametral sectional view of a device, the magnetic circuit of which is formed of welded annular shells.

According to FIG. 11, the magnetic circuit is formed of two annular shells 20 and 21, each having a channel-shaped cross-section, which together enclose the winding 4. A passage 19 is also provided for the ends 5 and 6 of the winding and the two shells are joined together at 22 by spot welding under load.

Figure 12:
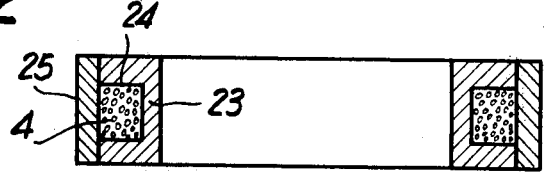
FIG. 12 is a diametral sectional view of a device, the magnetic circuit of which is formed of a banded ring.

In a modification shown in FIG. 12, the magnetic circuit is formed through a ring 23 having a radially outwardly facing groove 24 in which the winding 4 is seated. The air gap is nullified by means of a band 25, of the same depth as the ring 23 and mounted on the ring either hot or cold.

Figure 13:
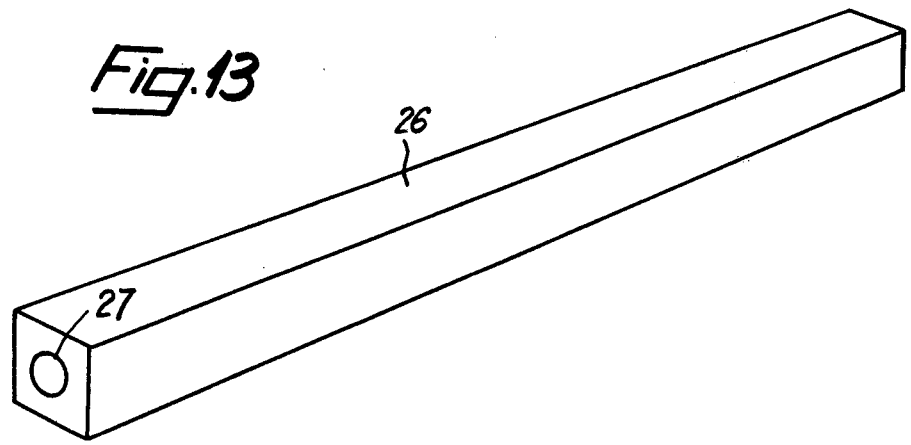
FIGS. 13 to 16 show in perspective the various stages in the manufacture of a device starting from a bar.
Figure 14:
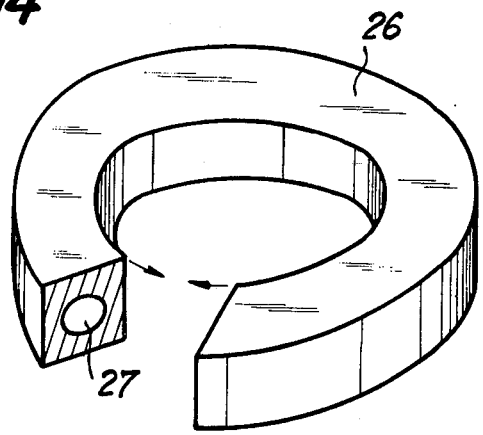
Figure 15:
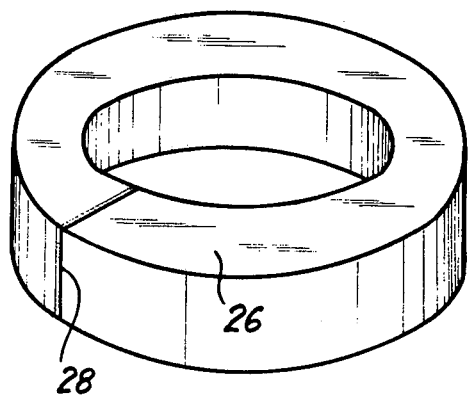
Figure 16:
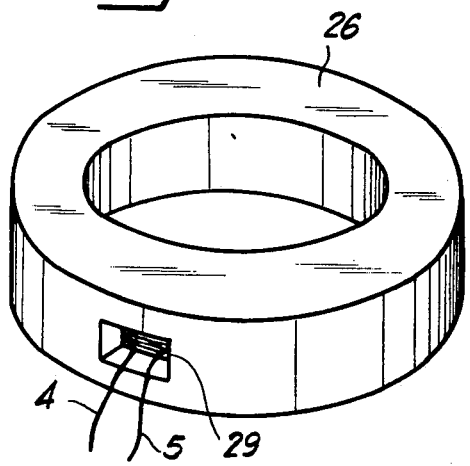

As illustrated in FIGS. 13 to 16, it is possible to manufacture the magnetic circuit of the device from a bar 26 of square or rectangular cross-section, of appropriate ferromagnetic material, and which is perforated by a longitudinal duct 27 (FIG. 13). This bar is bent round (FIG. 14), and then its ends are joined together by welding at 28 (FIG. 15). After thermal treatment to relieve the stresses, a lateral window 29 is formed which reaches to the central hole 27 and enables the winding 4 to be introduced, this winding being formed by one or more turns.

Figure 17:
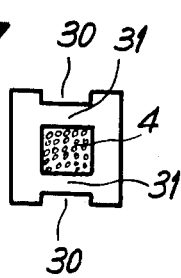
FIGS. 17, 18 and 19 are cross-sections of circuits so arranged as to avoid the appearance of tensile stresses in use.

In the case of magnetic circuits formed of blocks or of a perforated ring it is possible as shown in FIG. 17 to provide, at each of the faces of the ring against which the forces to be measured will be applied, regions which are recessed, for example peripheral recesses 30 of the same width substantially as the duct provided for the winding 4 and situated opposite this duct, in order to prevent the walls 31 of the circuit from bending; a situation which could give rise to tensile stresses which could have a harmful effect.

Figure 18:
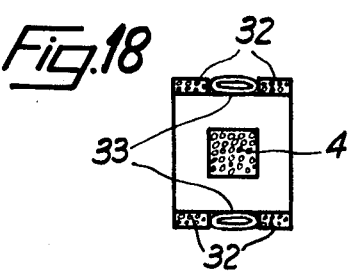

In FIG. 18 the ring carries, for the same purpose, bearing facings 32 which constitute peripheral recesses which may be lined with a spongy ring 33.

Figure 19:
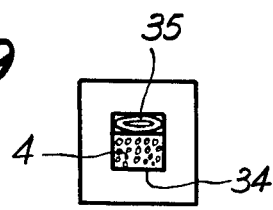

When the internal winding 4 must be embedded in an insulating material 34 such as resin, a ring 35 of spongy material may be arranged parallel to said winding as shown in FIG. 19, or a hollow is formed, so that the winding and its insulating material do not tend to compress laterally the walls of the magnetic circuit when the device is under load.

It is also possible to use, in parallel with the device, a block of low magnetic and elastic properties which is capable of absorbing a portion of the total force. In the limiting case, the device could be considered as a simple strain gauge.

It is also possible to prevent the occurrence of tensile stresses which are likely to destroy the linearity and reversibility of functioning of the dynamometric device, by introducing the winding 4 into ducts suitably formed in a massive ring.

Figure 20:
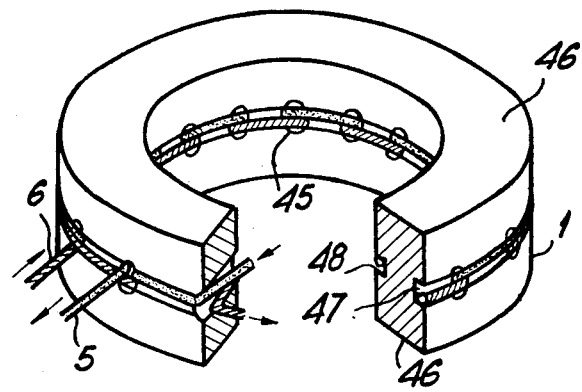
FIG. 20 is a perspective view, partly cut away, of an example in which the winding is mounted in slots and ducts formed parallel to the bearing faces of the ring.

In FIG. 20, the ring 1 is perforated by radial ducts 45, evenly distributed around the ring and having their axes situated in a plane equidistant from the two bearing faces 46 of the ring.

Figure 21:
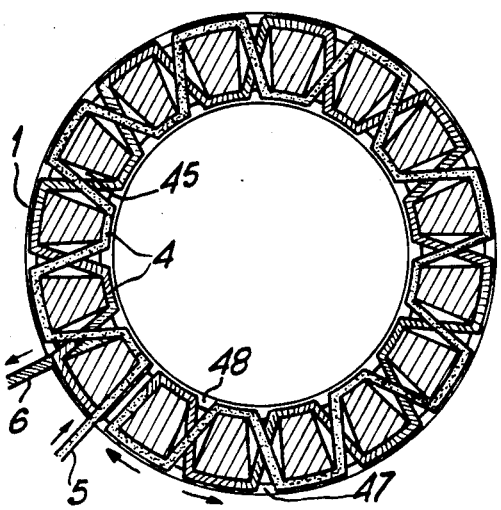
FIG. 21 is a sectional view corresponding to FIG. 20, seen through the central plane of the ducts.

The winding 4 is threaded alternately in one direction and then in the other in the successive ducts so that, for instance, each duct is traversed by two wires which cross each other, the ends 5 and 6 of the winding emerging through two ducts adjacent to each other, as illustrated in FIG. 21. Peripheral grooves 47 and 48 of sufficient depth may, with advantage, be formed in the lateral faces of the ring, at the position where the ducts emerge, so as to prevent the winding from being subjected to any impacts which might damage them.

Figure 22:
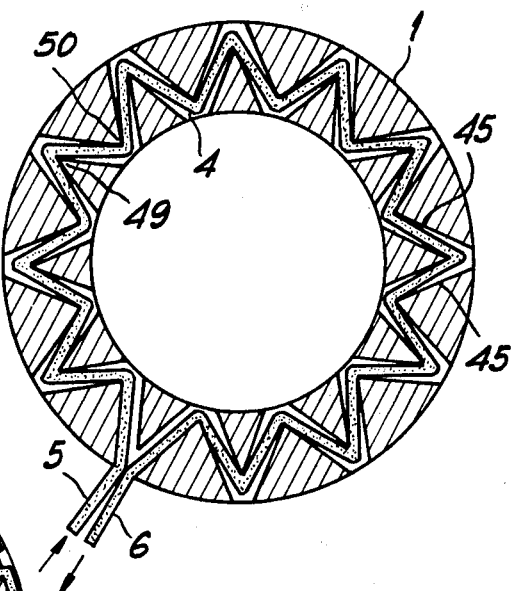
FIG. 22 is a view analogous to FIG. 21 but relating to a modification of the arrangement of the ducts.

Instead of providing radial ducts it is also possible, as illustrated in FIG. 22, to orient these ducts in such a way that they intersect one another in the vicinity of the position where they emerge at the lateral faces of the ring 1.

Internal corners 49 and 50 are thus formed in the ring, against which corners the winding 4 bears when it passes from one duct to the next. The winding is moreover entirely seated within the ring and, in this way, it is protected without it being necessary to hollow out grooves as in the preceding example.

In the modification shown in FIG. 23, the ducts 45 are formed starting from the bearing faces 46 of the ring, in the middle of these faces and parallel to the axis of the ring, and therefore substantially parallel to the forces. Said ducts are once again uniformly distributed around the ring. Grooves 51 are formed in the faces 46 in order to protect the winding 4, the ends 5 and 6 of which emerge through lateral slots, not shown. This winding may be produced by a double passing of the wire through the ducts 45 as illustrated in FIG. 24.

It is also possible so to arrange the ducts that they intersect one another at the vicinity of the position where they emerge at the bearing faces 46 of the ring, as shown in FIG. 25. Here again there are internal corners 52, against which the winding 4 bears and, as in the case of FIG. 22, this winding is mechanically and magnetically protected without it being necessary to hollow out grooves. It would also be possible to provide a number of coaxial ducts.

This type of dynamometric device having ducts which are parallel or substantially parallel to the direction of the forces is of particular advantage, since the flux develops in a quasi-circular manner around these ducts. The device is therefore sensitive to stresses perpendicular to the principal force. Moreover, though the variation in these stresses is only half as strong as in the case where they are parallel to the principal force, thus resulting in induction variations limited to 25%, the stresses are more homogeneous and an excellent linearity of calibration is maintained almost up to the point where the ring is completely crushed.

In FIGS. 26 and 27 the ring 1 possesses, at each of its terminal faces 46, an annular beading 53; one of the lateral faces of the beading, for example the internal face, is equipped with a threaded bearing region 54, to which it is possible to fit by screwing a component capable of transmitting tensile forces. This enables the dynamometric device to be used either in compression or in tension. It should be recalled that in tension the acceptable stresses are lower than in compression, since otherwise hysteresis phenomena may occur.

In FIG. 26, the ducts 45 serving for the installation of the winding 4 are of the type described in relation to FIG. 20, and in FIG. 27, two coaxial series of ducts 45 extending in the direction of the applied force are provided and are of the type described in relation to FIG. 23. These are positioned on either side of the beading 53, and grooves 51 are formed in the faces 46 of the ring.

The above-mentioned force transmission components could also be fitted to the ring by welding onto the beadings 53 or in any other appropriate manner.

The modification shown in FIGS. 28 to 30 also possess beadings 53 for the fitting of force transmission pieces, but the ducts 45, in the form of two coaxial series of equal numbers, arranged respectively on either side of the beadings, have been formed substantially at 45° to the axis of the ring, alternately in one direction and the other, and in such a way as to emerge at the faces 46 through orifices 55 which are common to them in pairs.

In addition, radial holes 56 have been formed at the base of the beadings 53, opposite the homologous orifices 35 of the two series. The winding 4 comprises two families of conductors which pass alternately from one duct 45 of one of the series to the duct 45 of the other series, with an intermediate passage through the corresponding hole 56 (FIG. 29).

In addition, the conductors of the two families are so arranged that their lengths situated in adjacent ducts 45 make an angle of 90° to one another, as illustrated in FIG. 30, in which the conductor 4a of one of the families has been shown in dot and dash line while the conductor 4b of the other family has been shown dotted.

Depending upon whether the sum or the difference of the impedances of these two families are considered, either the axial force or the torsional couple to which the ring is subjected may be determined.

The present invention may be applied to any kinds of measurements, notably for the purpose of monitoring the tensile forces of tensile members or prestressing cables. It is possible to use the same insulated electrical conductor to connect the device to the measuring apparatus without either welding or jointing, thus enabling the device to be buried in humid media and even under water. The device is easy to manufacture either starting from solid blanks or from juxtaposed pre-laminated elements. They are robust and of low cost and the ring need not necessarily be circular, and in particular its form can be varied depending upon the requirements of the particular application envisaged.

The device is of very small bulk, and an example has been constructed which is capable of measuring forces of a hundred tons, having a ring 10 centimeters in diameter and a square cross-section with a side of 2 centimeters.

It is evident that various modifications can be applied to the forms of embodiment just described, notably by substituting equivalent technical means, without thereby departing from the scope of the present invention.

We claim:
1. A stress measuring device, comprising:
a plurality of U-shaped pieces joined together to form a ferro-magnetic core having an uninterrupted annular cylindrical shape, each U-shaped piece having a base portion and a pair of leg portions extending from said base portion, adjacent ones of said U-shaped pieces being located with respect to each other such that the base portion of one U-shaped piece lies adjacent the open end of the next adjacent U-shaped piece said adjacent U-shaped pieces together defining a central annular duct within said core; and
means for detecting a compressive stress axially applied to said ferro-magnetic core, comprising an electric winding located in said annular duct in the form of a ring substantially surrounded by said core such that two ends of said winding comprising electrical leads extend out from said duct through an opening in a wall of said core.

2. A stress measuring device, comprising:
a ferro-magnetic core having an uninterrupted annular cylindrical shape;
an annular duct formed in said core, said duct having a substantially rectangular cross-section, the interior walls of said core defining said duct being substantially parallel with corresponding outer walls of said core;
a pair of annular recesses formed in top and bottom outer walls of said core, each of said recesses being defined by radially inner and outer upstanding leg portions of said core such that a compressive force applied to said device is exerted substantially exclusively on said upstanding leg portions, said recesses having a width substantially the same as the width of said annular duct;
means for detecting said compressive force axially applied to said ferro-magnetic core, comprising an electric winding located in said annular duct in the form of a ring substantially surrounded by said core, such that two ends of said winding comprising electrical leads extend out from said duct through an opening in a wall of said core; and
an annular resilient ring located in each of said recesses.

3. A stress measuring device, comprising:
a ferro-magnetic core having an uninterrupted annular cylindrical shape;
an annular duct formed in said core, said duct having a substantially rectangular cross section, the interior walls of said core defining said duct being substantially parallel with corresponding outer walls of said core;
means for detecting a compressive force axially applied to said ferro-magnetic core, comprising an electric winding embedded in an insulating material in said annular duct in the form of a ring substantially surrounded by said core, such that two ends of said winding comprising electrical leads extend out from said duct and through an opening in a wall of said core, said winding and insulating material being spaced from one interior wall of said core lying substantially parallel to an outer wall thereof to which said axial compressive force is applied; and a resilient ring located in the space between said winding and said one interior core wall to substantially prevent compression of said winding and insulating material when said axial compressive force is applied.

4. A stress measuring device, comprising:

a ferro-magnetic core having an uninterrupted annular cylindrical shape;

a plurality of through holes formed in and extending between parallel inner and outer axial walls of said core, wherein all of said through holes lie in a single plane between and substantially parallel to two axially opposite end faces of said core which define the load bearing faces of said core; and means for detecting a compressive force axially applied to said ferro-magnetic core, comprising an electrical winding composed of at least one conductor threaded through said holes in said axial walls of said core.

5. A stress measuring device according to claim 4, further comprising:

a first circumferential groove formed in said radially outer wall; and a second circumferential groove formed in said radially inner wall;

said through holes extending coplanar through said core in a radial direction between said first and second grooves; and said first and second grooves forming a path for the portions of said conductor lying between said through holes to protect said conductor from abrasive and compressive forces exerted on said axially extending walls.

6. A stress measuring device according to claim 5, wherein said coplanar through holes are substantially equidistant from each other around the circumference of said core, and said through holes are substantially equidistant from said two axially opposite end faces of said core.

7. A stress measuring device according to claim 4, wherein said through holes define a continuous series of V-shaped paths around said core.

8. A stress measuring device, comprising:

a ferro-magnetic core having an uninterrupted annular cylindrical shape, said core having axially opposed end faces defining the load bearing surfaces of said core;

beadings extending axially from said end faces, said beadings containing means for securing said measuring device to a force transmitting member;

a first set of through holes extending axially between said end faces in a first circumferential plane lying radially outward of said beadins;

a second set of through holes extending axially between said end faces in a second circumferential plane lying radially inward of said headings; and means for detecting a compressive force applied to said load bearing end faces, said means comprising an electrical winding composed of at least one conductor threaded through said axially extending holes.

9. A stress measuring device according to claim 8, further comprising:

first annular grooves formed on either side of the beading in one of said end faces; and second annular grooves formed on either side of the beading in the other of said end faces;

said through holes extending between said first and second grooves such that the longitudinal axes of said holes are substantially parallel to each other and to a central axis of said core; and said first and second grooves forming a path for the portions of said conductor lying between said through holes to protect said conductor from compressive forces exerted on said load bearing end faces.

10. A stress measuring device according to claim 8, wherein said through holes define a continuous series of V-shaped paths around said core.

11. A stress measuring device according to claim 8, wherein said winding comprises two families of conductors, a first composed of at least one conductor threaded through said first set of through holes and a second composed of at least one further conductor threaded through said second set of through holes.

12. A stress measuring device according to claim 8, further comprising:

a third set of through holes extending between a radially outer axial wall and a radially inner axial wall of one of said beadings; and a fourth set of through holes extending between a radially outer axial wall and a radially inner axial wall of a second of said beadings;

said at least one conductor being threaded through each of said first, second, third and fourth sets of through holes continuously.

* * * * *